United States Patent [19]
Koizumi et al.

[11] Patent Number: 5,997,987
[45] Date of Patent: *Dec. 7, 1999

[54] MAGNETIC RECORDING MEDIUM

[75] Inventors: Takeshi Koizumi; Norio Adachi; Miwako Sato, all of Miyagi, Japan

[73] Assignee: Sony Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/807,586

[22] Filed: Feb. 27, 1997

[30] Foreign Application Priority Data

Feb. 29, 1996 [JP] Japan .................................. 8-043806

[51] Int. Cl.$^6$ .................................................. G11B 5/716
[52] U.S. Cl. ......................... 428/141; 428/212; 428/323; 428/694 BM; 428/694 BR; 428/694 SG; 428/900
[58] Field of Search .................................... 428/212, 141, 428/694 BM, 323, 694 BR, 694 SG, 900

[56] References Cited

U.S. PATENT DOCUMENTS

| | | | |
|---|---|---|---|
| 4,624,883 | 11/1986 | Yamaguchi et al. | 428/212 |
| 5,043,210 | 8/1991 | Yamakawa et al. | 428/323 |
| 5,051,303 | 9/1991 | Noguchi et al. | 428/329 |
| 5,082,729 | 1/1992 | Nishida et al. | 428/329 |
| 5,085,915 | 2/1992 | Taga et al. | 428/141 |

*Primary Examiner*—Stevan A. Resan
*Attorney, Agent, or Firm*—Hill & Simpson

[57] ABSTRACT

This invention intends to offer a magnetic recording medium which is so devised as to give a wide dynamic range and a flat response over whole audible frequencies.

This invention attains the object by providing a magnetic recording medium which has two magnetic layers each composed mainly of ferromagnetic powder and a binder spread one over the other on one surface (front surface) of a non-magnetic substrate, wherein the ferromagnetic powder of either magnetic layer has a coercive force of 54.0–59.0 kA/m, and the coercive forces of the two magnetic layers differ by 3.2 kA/m or less. In addition, if a phase shift has to be minimized, the frictional coefficient of the back surface, and roughness ($Ra^f$) of the magnetic surface with respect to that ($Ra^b$) of the back surface or $Ra^f/Ra^b$ should be adjusted properly.

5 Claims, No Drawings

MAGNETIC RECORDING MEDIUM

BACKGROUND OF THE INVENTION

1. Field of the Invention

This invention relates to a so-called coated magnetic recording medium whose magnetic film is composed of two layers laid one over the other.

2. Prior Art

Audio tapes, video tapes, data-cartridges for backup, and floppy disks have been used widely as magnetic recording media. Although application of magnetic metal film by impregnation has been proposed and put to use for part of such recording media, conventional metal-coated magnetic recording media still occupy the main position, because they require only a low cost for production. The coated magnetic recording medium generally has a structure wherein a magnetic layer consisting mainly of ferromagnetic powder and a binder is spread over a non-magnetic substrate made of polyester or the like. The magnetic layer is formed after the ferromagnetic powder and binder have been allowed to disperse in an organic solvent, and the resulting paint has been spread over the non-magnetic substrate.

For a magnetic recording medium to work properly, it must be furnished with a number of properties; high electromagnetic conversion, excellent running performance and high durability. Let's take, as an example, an audiotape which is required of reproducing original sounds faithfully. To attain such objective, it must have an excellent magneto-electrical conversion, particularly it must maintain a wide separation (dynamic range) between noises and outputs over a whole audible range extending from low to high frequency regions.

Conventional methods for enlarging the dynamic range mainly consist of suppressing noises by reducing the size of ferromagnetic powder particles. However, if ferromagnetic powder particles are made finer, they will be slower in dispersion and penetration, which results in reduction of outputs. Thus, with these methods, a sufficient enlargement of dynamic ranges was impossible.

In view of this, a magnetic film with a double-layered structure has been proposed where the superficial layer is made to have a bigger coercive force than the underlying layer, or alternatively a similar structure where the superficial layer which is more conductive to noise production is made to have finer magnetic particles than the underlying layer. These means allow the product to have a wider dynamic range because they ensure high outputs and low noises at the same time.

With the magnetic recording media produced by the lastly mentioned methods, however, the superficial and underlying layers have different bias characteristics, and thus the output becomes deteriorated in an intermediate range extending from 1 to 5 kHz. With the product by those methods, therefore, it is impossible to have a wide dynamic range over a whole audible range including low and high frequency regions, namely, the product can not give a substantially linear frequency response over a whole audible range.

In view of the foregoing, the present invention intends to provide a magnetic recording medium capable of giving a substantially linear response over a whole audible frequency range.

The present inventors, to attain the object, had studied hard, found that, if, with a magnetic film having a double-layered structure, difference between the coercive forces of ferromagnetic powders contained in the superficial and underlying layers is properly chosen, the resulting magnetic recording medium will give a flat response over a whole audible frequency range, and achieved this invention.

SUMMARY OF THE INVENTION

This invention consists of a magnetic recording medium which has, on one of its substrate surface or the front surface, two magnetic layers containing ferromagnetic powder and a binder spread one over the other, wherein the ferromagnetic powders of both layers are made to have a coercive force of 54.0–59.0 kA/m and the difference between the coercive forces of the ferromagnetic powders of the two layers is made 3.2 kA/m or less. In addition, this invention provides a method by which to reduce a phase shift by properly adjusting the friction coefficient of the back surface, or the ratio $Ra^f/Ra^b$ where $Ra^f$ is a measure of roughness of the front (magnetic) surface and $Ra^b$ is a measure of roughness of the back surface.

DESCRIPTION OF THE PREFERRED EMBODIMENTS

As described above, this invention provides a magnetic recording medium with a double-layered structure capable of giving a wide dynamic range and a substantially linear or flat response over a whole audible frequency range. For a magnetic recording medium to have such capability, it must satisfy a number of requirements.

If either of the two magnetic layers had a coercive force out of the above-described range, the resulting magnetic medium would not give a flat response as expected. Or, if the difference between the coercive forces of the two layers exceeded 3.2 kA/m, the resulting magnetic medium would not give a flat response as expected.

Sound signals, when recorded onto a magnetic recording medium, are usually divided into two portions for L- and R-channels, and recorded onto separate tracks. Accordingly, for the medium to reproduce the sound signals faithfully, it is necessary to prevent the occurrence of a phase shift between the signals delivered through L- and R-channel. If there was a sufficiently big phase shift, the listener would feel the sound image to fluctuate, and this tendency would be still more manifest if signals from L-channel and those from R-channel differed so much in timing that they are reversely phased. Hence, the phase shift should be minimized, preferably within 10° C.

For the phase shift to be minimized, it is necessary to stabilize the running performance of the magnetic recording medium. For the running performance of the magnetic recording medium to be stabilized, what is effective is to adjust appropriately the friction coefficient of the surface (referred to as back surface hereinafter) opposite to the surface upon which a magnetic film is formed. To be concrete, the friction coefficient of the back surface of a magnetic recording medium should be preferably adjusted to 0.12–0.30. If the back surface had a friction coefficient below 0.12, it would slip over the magnetic head, or run a zigzag course, so that its whole surface from one end through center to the other could not keep proper and even contact with the magnetic head, which would cause a large phase shift. Further, edges of the magnetic tape might be damaged. On the contrary, if the back surface had a friction coefficient over 0.30, the magnetic tape could scarcely run stably.

For the phase shift to be further minimized, it is necessary to keep constant the distance between the magnetic head and the signal recording surface, which entails the flatness of the surface upon which a magnetic film is formed (that is, the surface facing the magnetic head, and this will be referred to as magnetic surface hereinafter). For this purpose, the smoothness of the magnetic surface should be adjusted appropriately with respect to the surface condition of the back surface. To be concrete, when $Ra^b/Ra^f$ represent the roughness of back and magnetic surfaces, respectively, the ratio $Ra^f/Ra^b$ should be preferably maintained at 0.45–0.60. If the ratio were out of this range, it would be difficult to keep constant the distance between the magnetic head and the signal recording surface, which would cause a large phase shift.

With the magnetic recording medium with a double-layered structure as described above, preferably only the superficial layer should be provided with inorganic powder particles. The binder to be contained in the underlying magnetic layer should be preferably chosen from materials whose glass transition temperature is 25° C. or lower, while the binder to be contained in the superficial layer should be preferably chosen from materials whose glass transition temperature is 45° C. or higher.

This invention will be described below with reference to preferred embodiments. This invention should be preferably applied to a so-called magnetic tape which has been produced by applying a magnetic film onto a non-magnetic substrate in the form of a tape, particularly to an audio tape which is used while being kept in a cartridge of a predetermined size.

This invention consists of a magnetic recording medium which has, on one of its substrate surface or the front surface, two magnetic layers each consisting mainly of ferromagnetic powder and a binder spread one over the other, wherein the ferromagnetic powders of both layers are made to have a coercive force of 54.0–59.0 kA/m and the difference between the coercive forces of the two ferromagnetic powders is made 3.2 kA/m or less.

In addition, in this invention the friction coefficient of the back surface should be preferably adjusted to 0.12–0.30, and the ratio $Ra^f/Ra^b$ where is a measure of roughness of the magnetic surface, and $Ra^b$ is a measure of roughness of the back surface should be preferably adjusted to 0.45–0.60.

Further, inorganic powder particles should be preferably added only to the superficial layer, the binder to be contained in the underlying layer should be preferably chosen from substances whose glass transition temperature is 25° C. or less, and the binder to be contained in the superficial layer should be preferably chosen from substances whose glass transition temperature is 45° C. or more.

In the magnetic tape of above constitution, the material to be used for the non-magnetic substrate or for those magnetic layers may include anything conventionally used for similar purposes, and is not limited to any specific substances.

The ferromagnetic powders to be contained in the magnetic layers may include any ferromagnetic substances publicly known as long as they satisfy the above relationships for their coercive forces. They may include, for example, metals such as Fe, Co, Ni or the like, alloys such as Fe—Co, Fe—Ni, Fe—Al, Fe— Ni—Al, Fe—Al—P, Fe—Ni—Si—Al, Fe—Ni—Si—Al—Mn, Fe—Ni—Zn, Fe—Mn—Zn, Co—Ni, Co—P, Fe—Co—Ni, Fe—Co—Ni—P, Fe—Co—Ni—Cr, Fe—Co—B, Fe—Co—Cr—B, Mn—Bi, Mn—Al, Fe—Co—V or the like, iron nitride, iron carbide, etc. Of course they may include, in addition, an appropriate amount of light metal such as Al, Si, P, B or the like for prevention of sintering during reduction reactions or for preservation of original configurations. They may further include, for example, ferromagnetic iron oxide particles such as berthollide compounds represented by $\lambda\text{-Fe}_2O_3$ (maghemite), $Fe_3O_4$ (magnetite), a berthollide compound comprising $\lambda\text{-Fe}_2O_3$ and $Fe_3O_4$, cobalt plated $\lambda\text{-Fe}_2O_3$, cobalt plated $Fe_3O_4$, a cobalt-containing berthollide compound comprising $\lambda\text{-Fe}_2O_3$ and $Fe_3O_4$; oxide particles which result from adding one or more of metal elements including Ru, Sn, Te, Sb, Fe, Bi, Ti, V, Mn or the like to $CrO_2$, and hexagonal ferrite particles with a hexagonal plate structure. Here Co-containing iron oxides are particularly recommendable.

The binder to be used in combination with such ferromagnetic powder may include, for example, a copolymer of vinyl chloride and vinyl acetate, a copolymer of vinyl chloride, vinyl acetate and vinyl alcohol, a copolymer of vinyl chloride, vinyl acetate and maleic acid, a copolymer of vinyl chloride and vinylidene chloride, a copolymer of vinyl chloride and acrylonitrile, a copolymer of ester acrylate and vinylidene chloride, a copolymer of ester methacrylate and vinylidene chloride, a copolymer of ester methacrylate and stylene, thermoplastic polyurethane resins, polyfluorovinyl, a copolymer of a vinylidene copolymer and an acrylonitrile copolymer, a copolymer of butadiene and acrylonitrile, a copolymer of acrylonitrile, butadiene and methacrylic acid, polyvinylbutyral, polyvinylacetal, cellulose derivatives, a copolymer of styrene and butadiene, polyester resins, phenol resins, phenoxy resins, epoxy resins, thermosetting polyurethane resins, urea resins, melamine resins, alkyd resins, urea-formaldehyde resins, etc. To such binder may be added either sulfonate salt of a metal ($—SO_3M$ where M represents an alkali metal such as Na, K or the like) or sulfate salt of a metal ($SO_4M$ where M represents an alkali metal such as Na, K or the like, or an alkyl group).

It should be added here that the binder to be contained in the underlying magnetic layer should preferably have, as described above, a glass transition temperature of 25° C. or less, and that the binder to be contained in the superficial layer should preferably have a glass transition temperature of 45° C. or more. Generally a paint incorporating a binder with a low glass transition temperature has a tendency to adhere firmly to the non-magnetic substrate, while a paint incorporating a binder with a high glass transition temperature tends to have a high mechanical strength. Thus, if the binders are appropriately chosen to satisfy the relationships as described above, they will give the paints which are satisfactory both in firm adhesion to the substrate and mechanical strength.

Further, as described above, inorganic particles may be added to the superficial magnetic layer. This may improve the durability and resistance to wear of the magnetic tape, prevent occurrence of static electricity and better running performance of the tape. It should be noted here, however, that addition of inorganic particles to the magnetic layer will lead to reduction of the relative content of the ferromagnetic powder, which may cause deterioration of electromagnetic conversion. Further, if ferromagnetic powder is disturbed in its orientation by the presence of inorganic particles, its rectangular magnetization conversion will be reduced. Accordingly, if a magnetic film has a double-layered structure, only the superficial layer should preferably contain inorganic powder particles.

The usable inorganic powder may include $Al_2O_3$, $Cr_2O_3$, $ZrO_2$ or the like for the improvement of durability and resistance to wear, and carbon black or graphite for the prevention of static electricity or for the improvement of running performance.

The above-described magnetic powder and binder are allowed to disperse in an organic solvent to produce a magnetic paint, and this organic solvent is not restricted to any specific substances. It may include, for example, ketone solvents such as acetone, methylethylketone, methylisobutylketone, cyclohexanone or the like, esters such as methyl acetate, ethyl acetate, butyl acetate, ethyl lactate, glycolmonoethylether acetate or the like, glycol ethers such as glycoldimethyl ether, glycolmonoethyl ether, dioxane or the like, aromatic hydrocarbons such as benzene, toluene, xylene or the like, aliphatic hydrocarbons such as hexane, heptane or the like, and chlorinated hydrocarbons such as methylene chloride, ethylene chloride, carbon tetrachloride, chloroform, ethylenechlorhydrin, dichlorobenzene or the like.

To this magnetic paint may be added additives such as a dispersant like lecithin, a lubricant like stearic acid or esters, and an anti-corrosive. These additives may include any substances publicly known.

Magnetic paints thus prepared are spread over a non-magnetic substrate so as to form a double-layered magnetic film thereupon. For this, may be employed a method whereby the underlying layer is formed firstly, and, after it has been dried, the second layer is formed. However, concurrent bilayer formation whereby two magnetic layers are formed at the same time is more preferred. The thickness of the underlying and superficial layers thus formed is not restricted to any specific value, but it will be better to make the underlying layer 1.0 time or more, or more preferably 1.1 to 4.0 times thicker than the superficial layer. To be concrete, the thickness of the underlying layer should preferably be 1.0–4.0 $\mu$m, and the summed thickness of the two layers 3.5–7.0 $\mu$m.

The non-magnetic substrate upon which the magnetic paints are spread may be made of any substances publicly known, and, for magnetic tapes, may include, for example, polymers represented by polyesters such as polyethylene terephthalate, polyethylene-2,6-naphthalate or the like, or polymers represented by polyethylenes, vinyl resins, polyolefins, celluloses, aromatic polyamides, polyimides, polycarbonates, etc.

In the magnetic tape according to this preferred embodiment, as described above, the frictional coefficient of the back surface and the ratio $Ra^f/Ra^b$ where $Ra^f$ and $Ra^b$ represent roughness of the magnetic and back surfaces respectively should be properly chosen. As long as these relationships are satisfied, the magnetic tape may have an additional coat (back coat) on the back surface and another additional coat (top coat) on the magnetic film as appropriate. A basement coat may be inserted between the underlying magnetic layer and the substrate. The formation and materials of back, top and basement coats are not restricted to any specific methods or substances, and any publicly known methods and substances used for similar purposes in the manufacture of magnetic recording media can be applied.

Magnetic tapes were prepared according to this invention, and submitted to various tests for their evaluation.

EXAMPLE 1

Two sets of materials for magnetic paints as described below were prepared, and they were separately mixed thoroughly with a sand mill to produce respective magnetic paints.

<Materials for the Magnetic Paint for the Underlying Layer>

| | |
|---|---|
| Ferromagnetic powder:Co containing $\gamma$-Fe$_2$O$_3$ | 100 parts by weight |
| Binder:a copolymer of vinylchloride compounds | 6 parts by weight |
| a polyester polyurethane resin | 8 parts by weight |
| Additives: a silane coupling agent | 1 part by weight |
| an isocyanate curing agent | 3 parts by weight |
| Solvent:methylethylketone/toluene/cyclohexanone | 100/100/50 parts by weight |

The ferromagnetic powder prepared here had a coercive force of 57.29 kA/m, a saturation level of magnetization of 80 emu/g and a BET specific surface area of 37 m$^2$/g.

<Materials for the Magnetic Paint for the Superficial Layer>

| | |
|---|---|
| Ferromagnetic powder:Co containing $\gamma$-Fe$_2$O$_3$ | 100 parts by weight |
| Binder:a copolymer of vinylchloride compounds | 6 parts by weight |
| a polyester polyurethane resin | 8 parts by weight |
| Additives: a silane coupling agent | 1 part by weight |
| alumina powder | 4 parts by weight |
| carbon black | 2 parts by weight |
| myristic acid | 0.2 part by weight |
| stearic acid ester | 0.4 part by weight |
| isocyanate curing agent | 3 parts by weight |
| Solvent:methylethylketone/toluene/cyclohexanone | 100/100/50 parts by weight |

The ferromagnetic powder used here had a coercive force of 57.29 kA/m, a saturation level of magnetization of 80 emu/g and a BET specific surface area of 45 m$^2$/g.

The magnetic paints described above were spread over a polyester film by the concurrent bilayer coating method. The film was then subjected to magnetic orientation treatment, dried, rolled, and, after being calendered, cured to have a double-layered magnetic film formed thereupon, and cut in such a way that a long strip of magnetic tape of ⅛ inch width was produced. This magnetic tape was taken as a sample tape of Example 1.

This sample tape had a frictional coefficient of 0.23 on its back surface, and a ratio $Ra^f/Ra^b$ of 0.48 where $Ra^f$ and $Ra^b$ stand for roughness of the magnetic and back surfaces, respectively. The frictional coefficient was calculated after the sample was placed on a brass platform and pulled with a weight of 0.49N, and necessary measurements were put into the Oyler's equation. The surface roughnesses $Ra^b$ and $Ra^f$ were measured with a three-dimensional roughness meter (SPA-11, Kosaka Research Institute) with the cut-off value set at 16 mm.

EXAMPLES 2–9

For these examples, the ferromagnetic powders contained in the underlying and superficial layers were allowed to have a coercive force varying between 54.0–59.0 kA/m, and they were allowed to be different each other in coercive force by 3.2 kA/m or less. In addition, the frictional coefficient of the back surface, and $Ra^f/Ra^b$ or the ratio of surface roughness of the magnetic surface against that of the back surface were also varied. These magnetic tapes were taken as sample tapes of Examples 2 to 9.

Relevant parameters of individual sample tapes are represented in Table 1. In Table 1, "Underlying Hc" represents the coercive force of the ferromagnetic powder contained in the underlying layer, "Superficial Hc," the coercive force of the ferromagnetic powder contained in the superficial layer, "Hc difference," difference in coercive force between the ferromagnetic powders in the superficial and underlying layers, "Frictional coefficient," the frictional coefficient of the back surface, "$Ra^f/Ra^b$," the ratio of roughness of the magnetic surface ($Ra^f$) against that of the back surface ($Ra^b$).

TABLE 1

|  | Underlying Superficial Hc (kA/m) | Underlying Superficial Hc (kA/m) | difference of Hc (kA/m) | Coefficient of Friction | $Ra^f/Ra^b$ |
|---|---|---|---|---|---|
| Example 1 | 57.29 | 57.29 | 0 | 0.23 | 0.48 |
| Example 2 | 54.11 | 57.29 | 3.18 | 0.22 | 0.56 |
| Example 3 | 54.11 | 55.31 | 1.20 | 0.31 | 0.47 |
| Example 4 | 54.11 | 55.70 | 1.59 | 0.10 | 0.41 |
| Example 5 | 54.11 | 57.29 | 3.18 | 0.09 | 0.40 |
| Example 6 | 55.70 | 55.70 | 0 | 0.26 | 0.65 |
| Example 7 | 57.29 | 57.29 | 0 | 0.27 | 0.72 |
| Example 8 | 54.11 | 55.31 | 1.20 | 0.13 | 0.68 |
| Example 9 | 57.29 | 55.31 | 1.98 | 0.15 | 0.72 |

Comparisons 1–11

For comparison, prepared were magnetic tapes in which the coercive force of the magnetic powders contained in the underlying and superficial layers, and the difference in coercive force of the magnetic powders contained in the superficial and underlying layers were kept out of the ranges described above. In addition, the friction coefficient of the back surface, and $Ra^f/Ra^b$ or the ratio of roughness of the magnetic surface against that of the back surface were also varied. These tapes were taken as sample tapes of Comparisons 1–11. Relevant parameters of these sample tapes are represented in Table 2.

TABLE 2

|  | Underlying Superficial Hc (kA/m) | Underlying Superficial Hc (kA/m) | difference of Hc (kA/m) | Coefficient of Friction | $Ra^f/Ra^b$ |
|---|---|---|---|---|---|
| Comparison 1 | 58.89 | 54.11 | 4.78 | 0.18 | 0.52 |
| Comparison 2 | 53.71 | 52.52 | 1.19 | 0.23 | 0.49 |
| Comparison 3 | 54.19 | 52.12 | 2.07 | 0.21 | 0.56 |
| Comparison 4 | 50.37 | 47.11 | 3.26 | 0.18 | 0.52 |
| Comparison 5 | 62.78 | 66.53 | 3.75 | 0.14 | 0.68 |
| Comparison 6 | 54.51 | 52.44 | 2.07 | 0.31 | 0.47 |
| Comparison 7 | 52.36 | 51.25 | 1.11 | 0.10 | 0.41 |
| Comparison 8 | 51.33 | 49.26 | 2.07 | 0.10 | 0.40 |
| Comparison 9 | 52.92 | 52.04 | 0.88 | 0.15 | 0.72 |
| Comparison 10 | 51.09 | 50.05 | 1.04 | 0.26 | 0.62 |
| Comparison 11 | 53.08 | 50.77 | 2.31 | 0.27 | 0.70 |

Evaluation of Performance

Sample tapes of Examples 1–9 and of Comparisons 1–11 were checked for their frequency characteristics and phase shifts for evaluation.

The checking was made as follows. Individual sample tapes, after having recorded 315 Hz, 2 kHz and 10 kHz signals, were run on a cassette deck for audio tapes (CR-70, Nakamichi Co.) for replay, and the outputs of signals with the three different frequencies were measured, and compared with and expressed relative to the corresponding outputs of reference tapes. When a given sample tape produced the same amount of replay output through the frequencies used, the tape was taken to have a flat frequency characteristics. The phase shift was measured as follows. Individual sample tapes having recorded a 10 kHz signal (−20 dB) were run on a cassette deck (TC-KA5ES, Sony Co.) for replay, and the phase shift appearing in the output signal was measured with a phase meter (MPM-551, Meguro Co.). The results of the measurement are listed in Tables 3 and 4.

TABLE 3

|  | Outputs of signals with different cps (dB) | | | Phase shift (°) |
|---|---|---|---|---|
|  | 315 Hz | 2 kHz | 10 kHz |  |
| Example 1 | +0.5 | +0.5 | −0.5 | 4 |
| Example 2 | +0.2 | +0.1 | −0.3 | 12 |
| Example 3 | −0.0 | +0.1 | +0.2 | 11 |
| Example 4 | +0.2 | +0.0 | −0.2 | 18 |
| Example 5 | +0.5 | −0.1 | −0.5 | 22 |
| Example 6 | +0.3 | +0.3 | +0.3 | 7 |
| Example 7 | +0.5 | +0.5 | +0.5 | 14 |
| Example 8 | +0.7 | +0.4 | −0.8 | 16 |
| Example 9 | +0.6 | +0.0 | +0.4 | 14 |

TABLE 4

|  | Outputs of signals with different cps (dB) | | | Phase shift (°) |
|---|---|---|---|---|
|  | 315 Hz | 2 kHz | 10 kHz |  |
| Comparison 1 | +0.4 | −0.0 | 1.2 | 12 |
| Comparison 2 | −0.3 | −0.3 | −0.9 | 12 |
| Comparison 3 | +0.6 | −0.6 | +0.5 | 12 |
| Comparison 4 | −1.7 | −2.8 | −1.3 | 12 |
| Comparison 5 | −0.8 | −0.5 | +2.3 | 16 |
| Comparison 6 | −0.4 | −1.7 | +1.0 | 11 |
| Comparison 7 | +0.1 | −0.7 | −1.1 | 18 |
| Comparison 8 | −1.7 | −2.6 | −2.5 | 22 |
| Comparison 9 | −1.5 | −0.5 | −2.7 | 14 |
| Comparison 10 | −1.9 | −0.5 | −2.4 | 18 |
| Comparison 11 | −0.8 | −1.6 | −1.0 | 14 |

Tables 3 and 4 indicate that the sample tapes of Comparisons 1–11 give replay outputs widely varied because they have, in the underlying and superficial magnetic layers, magnetic powders with a coercive force out of the range of 54.0–59.0 kA/m, or because they have, in the superficial and underlying magnetic layers, magnetic powders whose coercive force is different each other by more than 3.2 kA/m. By contrast, with the sample tapes of Examples 1–9, the magnetic powders contained in the underlying and superficial layers are so properly chosen as to give right coercive forces whose difference is also kept within the proper range. Thanks to these features, the sample tapes of Examples 1–9 have a wide dynamic range for all the frequencies tested and give a flat response over the frequency range tested.

What is worthy of mentioning here is that, if a sample tape, whether it is from Examples or Comparisons, has a back surface whose frictional coefficient is kept out of the range of 0.12–0.30, or a surface roughness wherein $Ra^f/Ra^b$ is kept out of the range of 0.45–0.60, it tends to give an output with a large phase shift.

Above results indicate that when a tape has, in the underlying and superficial magnetic layers, magnetic powders whose coercive forces are kept in the range of 54.0–59.0 kA/m and are different each other by 3.2 kA/m or less, the tape comes to have a wide dynamic range and a flat frequency response, and that adjusting roughness of the surfaces of a tape in such a way that the back surface has a frictional coefficient of 0.12–0.30 and $Ra^f/Ra^b$ is in the range of 0.45–0.60 will reduce phase shift. If a tape satisfies the above two requirements at the same time, it will give summed effects; a flat frequency response and a minimized phase shift.

Then, magnetic tapes were prepared of which inorganic particles were added for some, and withdrawn for others, and binders different in glass transition temperature were added. These magnetic tapes were checked of electromagnetic conversion, adhesion of the magnetic film to the substrate, and durability.

To be more concrete, magnetic paints A–I having compositions as described below were prepared, and magnetic tapes were produced from them in the same manner as in Example 1 except that these paints were combined to form a double-layered magnetic film. As a result, sample tapes to be used as Examples 10–18 were obtained.

<Magnetic Paint A>

| | |
|---|---|
| Ferromagnetic powder:Co containing $\gamma$-Fe$_2$O$_3$ | 100 parts by weight |
| Binder:a copolymer of vinylchloride compounds | 6 parts by weight |
| a polyester polyurethane resin a | 8 parts by weight |
| Additives: a silane coupling agent | 1 part by weight |
| isocyanate curing agent | 3 parts by weight |
| Solvent:methylethylketone/toluene/cyclohexanone | 100/100/50 parts by weight |

The ferromagnetic powder has a coercive force of 55.7 kA/m, and a BET specific area of 35 m$^2$/g.

<Magnetic Paint B>

| | |
|---|---|
| Binder:a copolymer of vinylchloride compounds | 7 parts by weight |
| a polyester polyurethane resin a | 7 parts by weight |

Other compositions are the same as in magnetic paint A.

<Magnetic Paint C>

| | |
|---|---|
| Binder:a copolymer of vinylchloride compounds | 10 parts by weight |
| a polyester polyurethane resin a | 4 parts by weight |

Other compositions are the same as in magnetic paint A.

<Magnetic Paint D>

The composition is the same as in magnetic paint A except that two parts by weight of carbon black were added.

<Magnetic Paint E>

| | |
|---|---|
| Ferromagnetic powder:Co containing Ei-Fe2O3 | 100 parts by weight |
| Binder:a copolymer of vinylchloride compounds | 17 parts by weight |
| Additives: a silane coupling agent | 1 part by weight |
| alumina powder | 4 parts by weight |
| carbon black | 2 parts by weight |
| myristic acid | 0.2 part by weight |
| stearic acid ester | 0.4 part by weight |
| isocyanate curing agent | 3 parts by weight |
| Solvent:methylethylketone/toluene/cyclohexanone | 100/100/50 parts by weight |

The ferromagnetic powder has a coercive force of 57.29 kA/m, and a BET specific area of 45 m$^2$/g.

<Magnetic Paint F>

| | |
|---|---|
| Binder:a copolymer of vinylchloride compounds | 12 parts by weight |
| a polyester polyurethane resin a | 5 parts by weight |

Other compositions are the same as in magnetic paint E.

<Magnectic Paint G>

| | |
|---|---|
| Binder:a copolymer of vinylchloride compounds | 12 parts by weight |
| a polyester polyurethane resin b | 5 parts by weight |

Other compositions are the same as in magnetic paint E.

<Magnetic Paint H>

| | |
|---|---|
| Binder:a copolymer of vinylchloride compounds | 12 parts by weight |
| a polyester polyurethane resin a | 2.5 parts by weight |
| a polyester polyurethane resin b | 2.5 parts by weight |

Other compositions are the same as in magnetic paint E.

<Magnetic Paint I>

| | |
|---|---|
| Binder:a copolymer of vinylchloride compounds | 8.5 parts by weight |
| a polyester polyurethane resin a | 8.5 parts by weight |

Other compositions are the same as in magnetic paint E.

The magnetic paints used for the superficial and underlying layers of the sample tapes of Examples 10–18, and the glass transition temperatures of the binders added thereto are listed in Table 5. For the sample tapes of Examples 10–17, the underlying and superficial magnetic layers are made to have a thickness of 3.0 μm and 2.0 μm, respectively. For the sample tape of Example 18, a single-layered magnetic film with a thickness of 5.5 μm was prepared.

TABLE 5

| | Upper magnetic layer | | Lower magnetic layer | |
|---|---|---|---|---|
| | Type of Paint | Tg of binder (°) | Type of Paint | Tg of binder (°) |
| Example 10 | H | 55 | A | 11 |
| Example 11 | H | 55 | B | 21 |
| Example 12 | G | 68 | B | 21 |
| Example 13 | E | 69 | A | 11 |
| Example 14 | H | 55 | D | 11 |
| Example 15 | G | 68 | C | 42 |
| Example 16 | I | 21 | B | 21 |
| Example 17 | F | 42 | A | 11 |
| Example 18 | F | 42 | — | — |

Magnetoelectric conversion was checked as follows. Rectangular conversion was measured with a magnetometer based on sample vibration (Toei Industry Co.), and maximum outputs at 315 Hz and 10 Hz were measured according to IEC94-5, JIS C 5566. To determine adhesion of a magnetic tape to the non-magnetic substrate, the magnetic film of the tape was pasted on the adhesive surface of an adhesive tape, a force was applied to the magnetic tape towards 180° angle in such a way that the magnetic tape was peeled off at a velocity of 50 mm/min, and the force was read out. To determine the mechanical durability of a magnetic tape, a scratch tester (Shinto Scientific Co.) was used whereby a steel ball weighing 20 g was allowed to give 50 repetitive falls on the magnetic surface of the film, and mechanical damages inflicted thereupon were evaluated visually. The evaluation consisted of four rankings: no damages ⊚; slight damages ○; definite damages Δ; and notable damages x. The evaluation results of individual sample tapes are listed in Table 6.

TABLE 6

| | Rectangular ratio | Maximum output with different cps (dB) | | Adhesion (g) | Film Durability (visual check) |
|---|---|---|---|---|---|
| | | 315 Hz/B.N. | 10 kHz | | |
| Example 10 | 0.90 | 8.2/−58.0 | − 2.9 | 32 | ○ |
| Example 11 | 0.91 | 8.1/−58.1 | − 3.1 | 23 | ○ |
| Example 12 | 0.92 | 8.5/−58.5 | − 3.0 | 23 | ○~⊚ |
| Example 13 | 0.90 | 8.2/−58.2 | − 3.0 | 33 | ⊚ |
| Example 14 | 0.85 | 7.2/−58.0 | − 4.0 | 28 | ○ |
| Example 15 | 0.92 | 7.5/−57.9 | − 3.5 | 8 | ○~⊚ |
| Example 16 | 0.88 | 7.0/−58.6 | − 4.5 | 24 | x |
| Example 17 | 0.88 | 7.2/−58.3 | − 4.7 | 30 | x-Δ |
| Example 18 | 0.83 | 5.8/−58.0 | − 5.2 | 12 | x-Δ |

Table 6 indicates that the sample tapes of Examples 10–13 are excellent in all the properties tested including magnetoelectric conversion, and adhesion and durability of the magnetic film, while the sample of Example 14 which has the underlying magnetic layer doped with carbon black suffers a deterioration in magnetoelectric conversion. The table further shows that for the sample tape of Example 15 wherein the binder contained in the underlying magnetic layer has a too high glass transition temperature, adhesion of the magnetic film to the non-magnetic substrate becomes poor, and for the sample tapes of Examples 16 and 17 wherein the binder contained in the superficial magnetic layer has a too low glass transition temperature, durability of the magnetic film becomes poor. The table still further shows that the sample tape of Example 18 whose magnetic film has a single layered structure is poor in all the properties tested, that is, magnetoelectric conversion, and adhesion and durability of the magnetic film.

From above results, it is evident that the inorganic powder particles to be used for prevention of static electricity and for improvement of running performance should preferably be added only to the superficial magnetic layer. It is also shown that the binder to be contained in the underlying magnetic layer should preferably have a glass transition temperature of 25° or less while the counterpart in the superficial layer should have a glass transition temperature of 45° or more.

As is evident from above description, when a magnetic recording medium is prepared in such a way that it has a double-layered magnetic film of which the coercive forces of the two layers are within a proper range determined by this invention, and their difference is within another proper range determined by this invention, the resulting medium will present with a wide dynamic range over the whole band of audible frequencies including low and high frequency components, and a flat frequency response over the same band.

In addition, when the frictional coefficient of the back surface, and $Ra^f/Ra^b$ or the ratio of roughness of the magnetic surface against that of the back surface are properly adjusted according to this invention, phase shift in output can be minimized. Accordingly, the magnetic recording medium of this invention allows faithful reproduction of original sounds including their three-dimensional expanse. In addition, when inorganic powder particles are added or withdrawn according to this invention, and the glass transition temperature of the binder is chosen properly according to this invention, the resulting product will give a highly reliable recording medium excellent in magnetoelectric conversion, adhesion of magnetic film to substrate, and endurance of the magnetic film.

What is claimed is:

1. A magnetic recording medium comprising:

a non-magnetic tape substrate having a front surface and an opposed back surface;

a first magnetic layer disposed on the front surface having a thickness of from about 1.0 to about 4.0 μm and comprising a binder having a glass transition temperature of about 25° C. or less and a ferromagnetic powder having a coercive force of from about 54.0 to about 59.0 kA/m and not containing any inorganic particles other than said ferromagnetic powder;

a second magnetic layer disposed on the first magnetic layer comprising a binder having a glass transition temperature of from about 45° C. or more and a ferromagnetic powder having a coercive force of from about 54.0 to about 59.0 ka/m; and the difference in coercive force of the ferromagnetic powder of the first magnetic layer and the coercive force of the ferromagnetic powder of the second magnetic layer being about 3.2 kA/m or less, the front surface of the tape substrate including the first and second magnetic layers having a surface roughness $Ra^f$, the back surface of the tape substrate having a coefficient of friction of from about 0.12 to about 0.30 and a surface roughness $Ra^b$, the ratio of $Ra^f/Ra^b$ being from about 0.45 to about 0.60, and the total thickness of the first and second magnetic layers being from about 3.5 to about 7.0 μm.

2. A magnetic recording medium as defined in claim 1, wherein the tape substrate comprises a polyethylene terephthalate, polyethylene-2,6-naphthalate, polyethylene, vinyl resin, polyolefin, cellulose, aromatic polyamide, polyimide or polycarbonate.

3. A magnetic recording medium as defined in claim 1, wherein the second magnetic layer further comprises an inorganic particle selected from the group consisting of $Al_2O_3$, $Cr_2O_3$ and $ZrO_2$.

4. A magnetic recording medium as defined in claim 1, wherein the second magnetic layer further comprises an additive selected from the group consisting of anti-static agents, dispersants, lubricants and anti-corrosive agents.

5. A magnetic recording medium as defined in claim 1, wherein the binder for the first magnetic layer and the binder for the second magnetic layer comprises a polyester polyurethane resin.

* * * * *